United States Patent
Lahti et al.

(10) Patent No.: US 7,293,177 B2
(45) Date of Patent: Nov. 6, 2007

(54) PREVENTING VIRUS INFECTION IN A COMPUTER SYSTEM

(75) Inventors: Pasi Lahti, Helsinki (FI); Sino Huopio, Helsinki (FI); Ismo Bergroth, Helsinki (FI)

(73) Assignee: F-Secure OYJ, Helsinki (FI)

( * ) Notice: Subject to any disclaimer, the term of this patent is extended or adjusted under 35 U.S.C. 154(b) by 260 days.

(21) Appl. No.: 10/485,820

(22) PCT Filed: Aug. 8, 2002

(86) PCT No.: PCT/EP02/08922

§ 371 (c)(1),
(2), (4) Date: Sep. 29, 2004

(87) PCT Pub. No.: WO03/017068

PCT Pub. Date: Feb. 27, 2003

(65) Prior Publication Data

US 2005/0033975 A1 Feb. 10, 2005

(30) Foreign Application Priority Data

Aug. 17, 2001 (GB) ................... 0120095.5

(51) Int. Cl.
*G06F 11/30* (2006.01)
(52) U.S. Cl. .............. 713/188; 713/189; 713/190; 726/22; 726/24; 712/200; 712/204; 712/205; 712/208; 712/214; 712/216
(58) Field of Classification Search ............... 713/188, 713/189, 190; 726/22, 24; 712/200, 204, 712/205, 208, 214, 216
See application file for complete search history.

(56) References Cited

U.S. PATENT DOCUMENTS 5,274,819 A * 12/1993 Blomfield-Brown ........ 718/100
6,728,964 B1 * 4/2004 Butt .......................... 719/313
7,017,187 B1 * 3/2006 Marshall et al. .............. 726/24

OTHER PUBLICATIONS

Norman; "Norman Virus Control for Workstations"; Mar. 31, 2001; pp. 35-40 XP-002241249.
McAfee; "McAfee Netshield for Netware—Administrator's Guide—Version 4.5"; pp. 70-71 XP-002241250, Jul. 31, 2000.
IBM Technical Disclosure Bulletin, IBM Corp. New York, US; "Access/Control Icons (Icon Keys)"; vol. 38, No. 4; Apr. 1, 1995; pp. 407-409 XP 000516196.
F-Secure; "F-Secure Announces World's First Anti-Virus Product for Wireless Information Devices"; Aug. 15, 2000; XP-002220984.
Novell; "Open File (old) 0x2222 65"; May 15, 2003; XP-002242389.

* cited by examiner

*Primary Examiner*—Taghi Arani
(74) *Attorney, Agent, or Firm*—Arent Fox, LLP.

(57) ABSTRACT

A method of preventing an electronic file containing a computer virus from infecting a computer system using the Symbian™ operating system, the method comprising the steps of scanning files using an anti-virus application, and if an infected file is identified, maintaining the file in an open non-sharing state, whereby other applications running on the computer system may not operate on an infected file.

5 Claims, 2 Drawing Sheets

| File ID | open/closed | File sharing |
| --- | --- | --- |
| 1 | closed | sharing |
| 2 | open | non-sharing |
| 3 | open | sharing |
| ⋮ | ⋮ | ⋮ |
| n | closed | sharing |

PREVENTING VIRUS INFECTION IN A COMPUTER SYSTEM

CROSS-REFERENCE TO RELATED APPLICATION

This application is a National Stage entry of International Application No. PCT/EP02/08922, the entire specification claims and drawings of which are incorporated herewith by reference.

FIELD OF THE INVENTION

The present invention relates to the prevention of virus infection in a computer system.

BACKGROUND TO THE INVENTION

Virus infection of computers and computer systems is a growing problem. Recently there have been many high profile examples where computer viruses have spread rapidly around the world causing many millions of pounds worth of damage in terms of lost data and lost working time.

Computer viruses are spread in many different ways. Early viruses were spread by the copying of infected files onto floppy disks, and the transfer of the file from the disk onto a previously uninfected computer. When the user tries to open the infected file, the virus is triggered and the computer infected. More recently, viruses have in addition been spread via the Internet, for example using e-mail. In the future it can be expected that viruses will be spread by the wireless transmission of data, for example by communications between mobile communication devices using a cellular telephone network.

Various anti-virus applications are available on the market today. These tend to work by maintaining a database of signatures or fingerprints for known viruses. With a "real time" scanning application, when a user tries to perform an operation on a file, e.g. open, save, or copy, the request is redirected to the anti-virus application. If the application has no existing record of the file, the file is scanned for known virus signatures. If a virus is identified in a file, the anti-virus application reports this to the user, for example by displaying a message in a pop-up window. The anti-virus application may then add the identity of the infected file to a register of infected files. Access to the file is denied. When a subsequent operation on the file is requested, the anti-virus application first checks the register to see if the file is infected. If it is infected, the access is denied. If the file is not infected, access is permitted (the anti-virus application may re-check the file if it detects that the file has changed since the previous check was performed).

The approach described in the preceding paragraph for preventing access to infected files is relatively complex and requires a detailed understanding of the workings of the operating system. It also requires some modification to the operating system. Whilst this is allowed (to some extent) by the Microsoft Windows™ operating system, providers of other operating systems may be more reticent to allow interference with their operating systems as this in itself presents a potential security risk.

In order to overcome some of the problems, devices may be provided with only an "on-demand" anti-virus scanning application. A user must specifically direct the scanner to scan one file or a group of files. As the application does not have direct access to the operating system, it is not possible to redirect subsequent requests to access an infected file to the anti-virus application. The only option to prevent infection therefore are disinfection of an infected file or, if this is not possible or desirable, deletion of the infected file.

SUMMARY OF THE INVENTION

According to a first aspect of the present invention there is provided a method of preventing an electronic file containing a computer virus from infecting a computer system, the method comprising the steps of:

scanning files using an anti-virus application; and if an infected file is identified, maintaining the file in an open non-sharing state, whereby other applications running on the computer system may not operate on an infected file.

Embodiments of the present invention present a simple and elegant solution for "locking" infected electronic files. Typically, no modification is required to the operating system providing that the system allows files to be marked as non-sharing, i.e. only one application at a time can access a file (and an application can only access a file once at any given time).

The present invention is applicable in particular to the Symbian™ operating system.

Preferably, when the operating system of the computer system receives a request from an application to access a previously unaccessed file, the anti-virus application passes a file open command to the operating system which includes as an attribute a non-sharing mode. The operating system maintains a register of accessed files, and the current file is added to the register with the attributes OPEN and NON-SHARING. While the register records these attributes for the file, if another application attempts to access the file an error will be returned to that application by the operating system.

If the scan of the file reveals that the file is not infected, the anti-virus application will return a file close command to the operating system, whereupon the operating system will set the attributes in the register for the file to CLOSED and SHARING. However, if a virus is detected in the file, no close command will be returned. The file will therefore remain open and in a non-sharing state. Again, if another application attempts to open the file, an error will be returned to that application.

According to a second aspect of the present invention there is provided a computer device having processing means arranged in use to scan files using an anti-virus application, and if an infected file is identified, to maintain the file in an open non-sharing state, whereby other applications running on the computer device may not operate on an infected file.

According to a third aspect of the present invention there is provided a data storage medium having stored thereon a computer program for causing a computer device to scan files using an anti-virus application, and if an infected file is identified, to maintain the file in an open non-sharing state, whereby other applications running on the computer system may not operate on an infected file.

DETAILED DESCRIPTION OF CERTAIN EMBODIMENTS

Figures 1, 2:
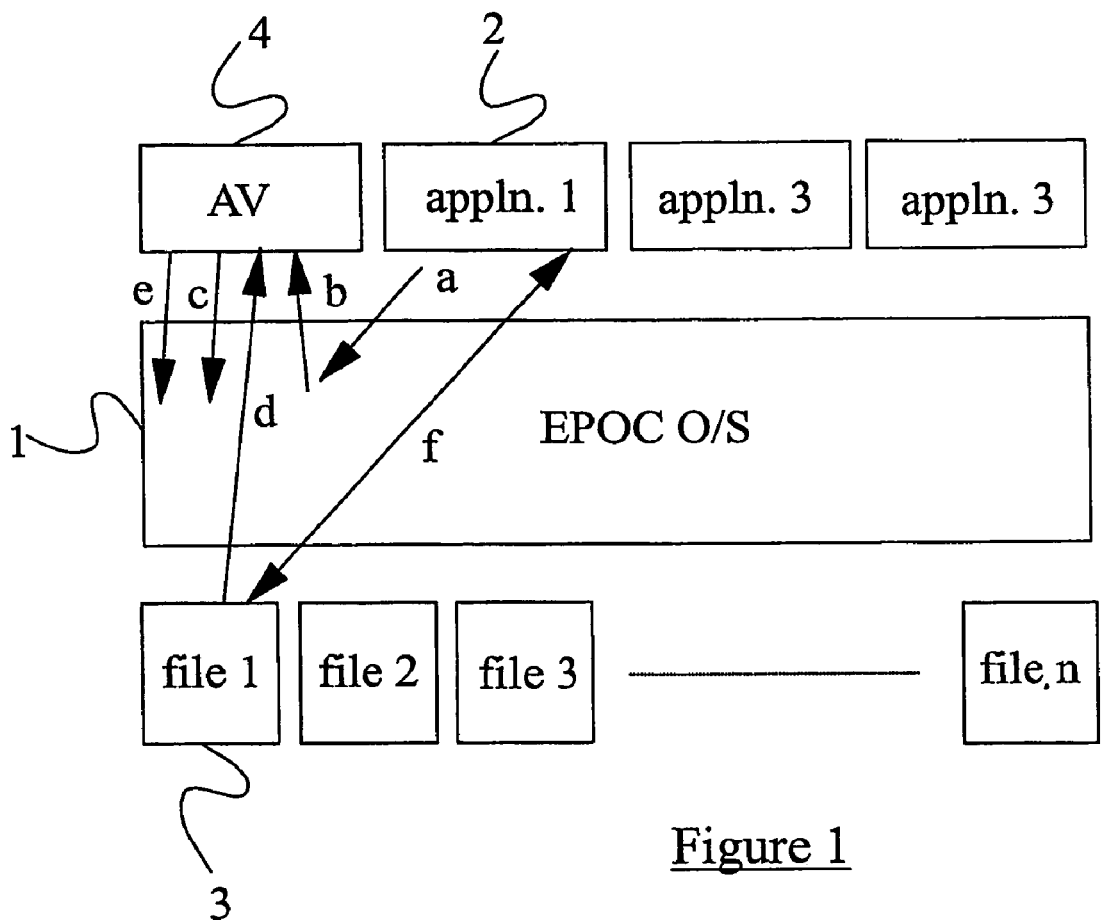
FIG. 1 illustrates schematically the high level architecture of a typical computer system from a file access point of view.
FIG. 2 is a table illustrating logical file sharing principles in a particular operating system file system.

The example which will now be described relates to a mobile computer device such as a mobile telephone, communicator, PDA or similar mobile device which uses the Symbian™ operating system (O/S) developed by Symbian. Symbian has been specifically designed for mobile computing platforms. FIG. 1 illustrates how the Symbian O/S 1 interacts with applications 2 such as the Sheet and Calendar applications, to enable the applications to access files 3 which may be data files or program files. Both the applications and the files may be stored in a common device memory.

The operating system 1 may for example maintain a file register in which are recorded the identities of previously accessed files. This register is illustrated in FIG. 2. For each file the register records whether the file is currently open and whether the file is in a sharing or a non-sharing state. In a sharing state, a file may be accessed simultaneously by two or more applications and/or a single application may make multiple simultaneous accesses to a that file. In a non-sharing state, the operating system will allow only a single application to make a single access to a file. The register may also record other file attributes. However, these are not relevant to the present discussion.

In order to secure the device against virus infection an anti-virus application 4 is loaded into the device's memory. The anti-virus application 4 may for example be based upon the F-Secure Anti-Virus™ application, using a database of virus signatures and other techniques to identify infected files. In the following example, it is assumed that the anti-virus application is a real time scanner.

In a known manner, when the Symbian O/S 1 receives a request {step a} from an application 2 to access a file 3 (this may be an open file request Rfile.Open( ), a copy request, a save request, or some other request), the O/S detects using its own internal data structures whether or not some other application is already accessing the file. How this step is carried out by the O/S depends upon the architecture of the O/S. However, one possibility is that the O/S first inspects the register to see if it contains an entry for the identified file. If there is no entry in the register for this file, one is created by the O/S. The O/S informs the anti-virus application 4 {step b} of the access request. The anti-virus application 4 then issues an Rfile.Open(SESSIONNAME,MYFILENAME,EFILESHAREEXCLUSIVE) command {step c}, where the bracketed expression contains the arguments of the instruction. SESSIONNAME identifies the file server session, whilst MYFILENAME identifies the name of the file to be opened (and scanned). Any path components which are not specified in the file name will be taken from the session path. The EFILESHAREEXCLUSIVE argument defines the mode in which the file is to be opened—in this case in a non-sharing mode. The O/S responds to receipt of this command by updating the entry in the register for this file to record the file as open and non-sharing.

Assuming that no error is returned to the anti-virus application (e.g. because the filename is invalid), the O/S will enable the anti-virus application to access the file {steps d}. The application will scan the data contained in the file (or possibly certain parts of the data) for viruses. If a virus is not detected, the anti-virus application will return a Close command to the O/S {step e}. This will cause the O/S to reset the entry for the file in the register from open to closed, and to sharing mode. The O/S will then allow the application which initially submitted the access request, to access the file {step f}.

If a virus is detected, the anti-virus application will display a message notifying the user of the infected file. The message may propose that the application try to disinfect the file and/or that the file be deleted. If disinfection is not possible, not available, or the user chooses not to disinfect, and the user chooses not to delete the file, the anti-virus application maintains the infected file in an open mode, i.e. it does not send a Close command to the O/S (step e is not carried out). As far as the operating system is concerned, the file is open and in use. As the non-sharing flag is set, no other application will be able to access the file. So long as the file cannot be accessed by an application, the computer device will not become infected.

Figure 3:
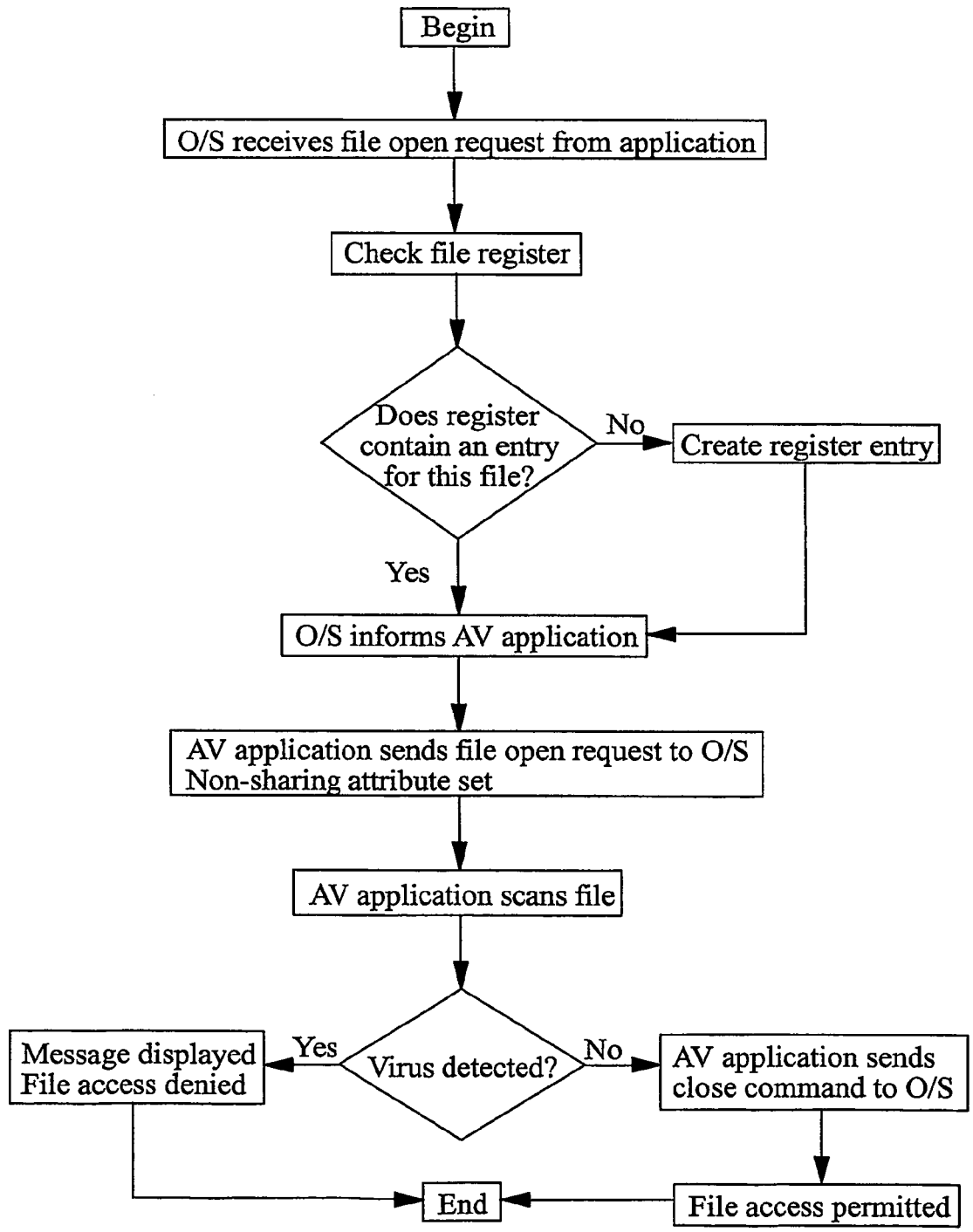
FIG. 3 is a flow diagram illustrating a mechanism for preventing the infection of a computer system by a computer virus.

FIG. 3 is a flow diagram illustrating in detail a virus scanning and file locking mechanism. It will be appreciated that the internal workings of the O/S are not necessarily relevant to the present invention and that these may vary depending between O/Ss.

It will be appreciated by the person of skill in the art that various modifications may be made to the above described embodiment without departing from the scope of the present invention. In particular, the anti-virus application may provide an on-demand scanner in addition to or as an alternative to a real time scanner. A user will instruct the application to scan individual files or groups of files. When an infected file is identified, the application does not send a close command to the O/S after scanning. The O/S therefore records the infected file as open and in a non-sharing mode. No other application can access the infected file in this state. If the infected file cannot be disinfected immediately by the anti-virus application, it can be effectively quarantined until the file can be inspected and repaired by an expert.

The invention claimed is:

1. A method of preventing an electronic file containing a computer virus from infecting a computer system, the computer system having a Symbian operating system, the method comprising the steps of:
   scanning files using an anti-virus application in the computer system having a Symbian operating system;
   if an infected file is identified, maintaining the file in an open non-sharing state after scanning the infected file, whereby other applications running on the computer system may not operate on an infected file; and
   if no infection is identified, closing the file.

2. A method according to claim 1 wherein, when the operating system of the computer system receives a request from an application to access a previously unaccessed file, the anti-virus application passes a file open command to the operating system which includes as an attribute a non-sharing mode.

3. A method of preventing an electronic file containing a computer virus from infecting a computer system, the computer system having an operating system, the method comprising the steps of:
   scanning files using an anti-virus application, such that when the operating system of the computer system receives a request from an application to access a previously unaccessed file, the anti-virus application passes a command to the operating system to open the previously unaccessed file in a non-sharing mode, wherein, if a virus scan of the file reveals that the file is not infected, the anti-virus application returns a file close command to the operating system, whereupon the operating system will set the attributes for the file to closed and sharing, and, if a virus scan reveals that the file is infected, a no close command will be returned so that file attributes remain as open non-sharing state after scanning the file.

4. A computer device having processing means arranged in use to scan files using an anti-virus application, wherein, the computer device is cart of a computer system having a Symbian operating system, and wherein if an infected file is identified, the processing means maintain the file in an open non-sharing state after a scan, whereby other applications running on the computer device may not operate on an infected file, and wherein if no infection is identified, the processing means closes the file.

5. A data storage medium having stored thereon a computer program for causing a computer device to scan files using an anti-virus application, wherein the data storage medium is capable of use in a computer system having a Symbian operating system, wherein if an infected file is identified, the computer program maintains the file in an open non-sharing state after a scan, whereby other applications running on the computer system may not operate on an infected file, and wherein if no infection is identified, the computer program closes the file.

* * * * *